(12) United States Patent
Sagar

(10) Patent No.: US 8,222,994 B1
(45) Date of Patent: Jul. 17, 2012

(54) TECHNIQUES TO PROVIDE AUTOMATIC REMINDERS

(75) Inventor: Richard Bryan Sagar, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 917 days.

(21) Appl. No.: 11/365,200

(22) Filed: Feb. 28, 2006

(51) Int. Cl.
  G08B 5/22 (2006.01)
  G08B 25/00 (2006.01)
  H04L 9/32 (2006.01)
  H04M 1/64 (2006.01)
  G06F 9/46 (2006.01)

(52) U.S. Cl. .............. 340/7.52; 340/7.22; 340/7.31; 340/6.1; 379/88.12; 718/101; 713/181

(58) Field of Classification Search .............. None
See application file for complete search history.

(56) References Cited

U.S. PATENT DOCUMENTS

| | | | | |
|---|---|---|---|---|
| 4,630,035 A * | 12/1986 | Stahl et al. | ............. | 340/539.13 |
| 5,602,963 A * | 2/1997 | Bissonnette et al. | ......... | 704/275 |
| 6,587,835 B1 * | 7/2003 | Treyz et al. | ............. | 705/14.64 |
| 7,039,420 B2 * | 5/2006 | Koskinen et al. | ......... | 455/456.1 |
| 7,558,623 B2 * | 7/2009 | Fischell et al. | ............. | 600/517 |
| 7,577,522 B2 * | 8/2009 | Rosenberg | ................... | 701/213 |
| 7,696,868 B1 * | 4/2010 | Emigh | .................... | 340/539.13 |
| 2002/0169614 A1 * | 11/2002 | Fitzpatrick et al. | ........ | 704/270.1 |
| 2003/0087665 A1 * | 5/2003 | Tokkonen | ................... | 455/556 |
| 2003/0112266 A1 * | 6/2003 | Chang et al. | ................ | 345/727 |
| 2004/0131162 A1 * | 7/2004 | Silver et al. | ................ | 379/88.12 |
| 2005/0136903 A1 * | 6/2005 | Kashima et al. | ............ | 455/418 |
| 2005/0155056 A1 * | 7/2005 | Knee et al. | .................... | 725/35 |
| 2005/0225438 A1 * | 10/2005 | Wang | ........................ | 340/309.7 |
| 2006/0073822 A1 * | 4/2006 | Orton et al. | ................... | 455/423 |
| 2006/0077763 A1 * | 4/2006 | Saukkonen | .................... | 368/28 |
| 2006/0182085 A1 * | 8/2006 | Sweeney et al. | ............. | 370/352 |
| 2007/0129888 A1 * | 6/2007 | Rosenberg | ................... | 701/213 |

\* cited by examiner

*Primary Examiner* — Jennifer Mehmood
*Assistant Examiner* — Fekadeselassie Girma

(57) ABSTRACT

Techniques to provide automatic reminders are described. A mobile computing device may comprise a memo database and a memo application. The memo application may be arranged to set a memo reminder value for a memo, store the memo with the memo reminder value in the memo database, and provide a memo reminder for the memo with the memo reminder value. Other embodiments may be described and claimed.

10 Claims, 6 Drawing Sheets

TECHNIQUES TO PROVIDE AUTOMATIC REMINDERS

BACKGROUND

A mobile computing device such as a smart phone may have voice and data communications capabilities as well as processing capabilities. The processing capabilities may allow a mobile computing device to store and execute a number of application programs, such as a memo application, for example. A memo application may allow a user to take memos or notes using a number of different modalities, such as voice recordings, text-based memos, image-based memos, and so forth. Improvements in memo applications may allow a user to generate a memo in a relatively short period of time under various conditions. For example, a user may generate a quick voice memo while driving. The increase in convenience, however, may also increase the number of memos. Accordingly, there may be a need for improved techniques to assist managing memo applications.

DETAILED DESCRIPTION

Various embodiments may be generally directed to techniques for providing automatic reminders. Some embodiments may be directed to automatic reminder techniques for use with memo applications. In one embodiment, for example, a mobile computing device such as a smart phone may comprise a memo database and a memo application. The memo application may be arranged to set a memo reminder value for a memo, store the memo with the memo reminder value in the memo database, and provide a memo reminder for the memo with the memo reminder value. In this manner, a user may be automatically reminded that a memo has been stored and not reviewed within a predefined amount of time. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
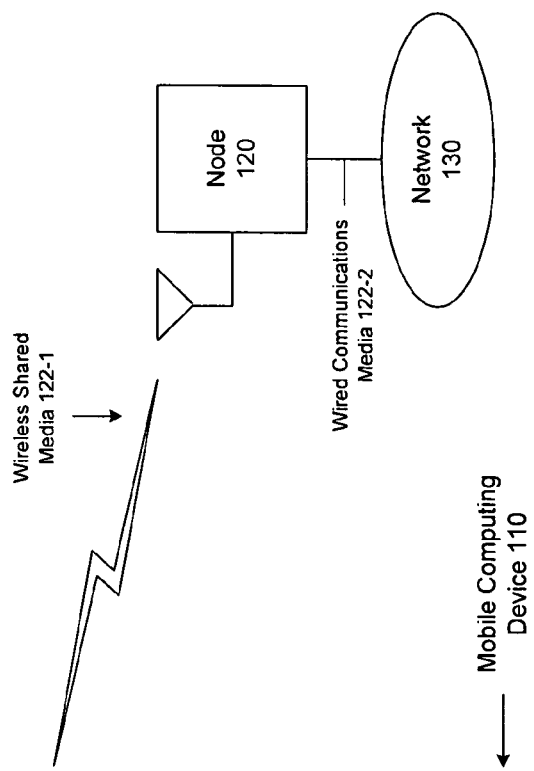
FIG. 1 illustrates one embodiment of a communications system.
Figure 1:
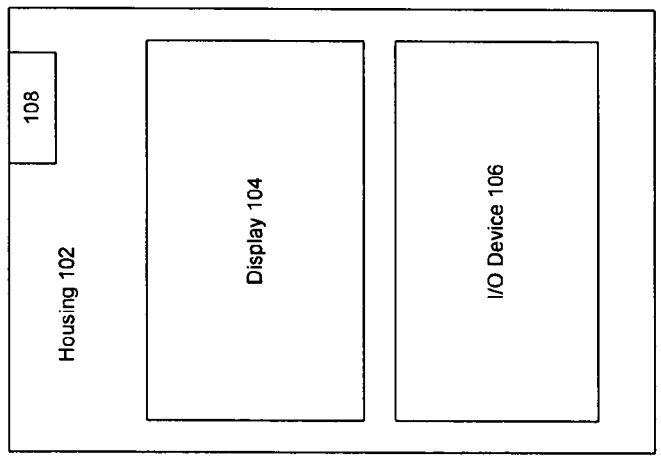

FIG. 1 illustrates one embodiment of a communications system 100. In various embodiments, communications system 100 may be implemented as a wireless communication system, a wired communication system, or a combination of both. When implemented as a wireless communication system, communications system 100 may include components and interfaces suitable for communicating over wireless shared media 122-1, such as one or more antennas, transmitters, receivers, transceivers, amplifiers, filters, control logic, and so forth. An example of wireless shared media 122-1 may include portions of a wireless spectrum, such as the RF spectrum and so forth. When implemented as a wired communications system, communications system 100 may include components and interfaces suitable for communicating over wired communications media 122-2, such as input/output (I/O) adapters, physical connectors to connect the I/O adapter with a corresponding wired communications medium, a network interface card (NIC), disc controller, video controller, audio controller, and so forth. Examples of wired communications media 122-2 may include a wire, cable, metal leads, printed circuit board (PCB), backplane, switch fabric, semiconductor material, twisted-pair wire, co-axial cable, fiber optics, and so forth. The embodiments are not limited in this context.

In various embodiments, communications system 100 may include a mobile computing device 110. Mobile computing device 110 may comprise any device having a processing system and a portable power source (e.g., a battery). Examples of a mobile computing device may include a computer, laptop computer, ultra-laptop computer, portable computer, handheld computer, palmtop computer, personal digital assistant (PDA), cellular telephone, combination cellular telephone/PDA, smart phone, pager, one-way pager, two-way pager, messaging device, data communication device, and so forth. Examples of a mobile computing device may also include computers that are arranged to be worn by a person, such as a wrist computer, finger computer, ring computer, eyeglass computer, belt-clip computer, arm-band computer, shoe computers, clothing computers, and other wearable computers. In one embodiment, for example, mobile computing device 110 may be implemented as a smart phone having both wireless voice and/or data communications capabilities, as well as processing capabilities. Although some embodiments may be described with mobile computing device 110 implemented as a smart phone by way of example, it may be appreciated that other embodiments may be implemented using other mobile computing devices as well. The embodiments are not limited in this context.

In various embodiments, mobile computing device 110 may comprise a housing 102. Housing 102 may be made of any material suitable for encapsulating some or all of the components of mobile computing device 110, such as metal, plastic, carbon fiber, polymers, and so forth. In one embodiment, housing 102 may also have a shape, size and/or form factor capable of being held with an average human hand. In one embodiment, housing 102 may also include a slot to hold a stylus for use with a touch screen. The embodiments are not limited in this context.

In various embodiments, mobile computing device 110 may comprise an input/output (I/O) device 106. I/O device 106 may comprise any suitable I/O device for entering information into a mobile computing device. Examples for I/O device 106 may include an alphanumeric keyboard, a numeric keypad, a touch pad, a touch screen, input keys, buttons, switches, rocker switches, and so forth. In one embodiment, for example, I/O device 106 may include a four-direction rocker switch with an input button in approximately the center of the rocker switch. The embodiments are not limited in this context.

In one embodiment, mobile computing device 110 may include a display 104. Display 104 may comprise any suitable display unit for displaying information appropriate for a mobile computing device. In addition, display 104 may be implemented as an additional I/O device, such as a touch screen, touch panel, touch screen panel, and so forth. Touch screens are display overlays which are implemented using one of several different techniques, such as pressure-sensitive (resistive) techniques, electrically-sensitive (capacitive) techniques, acoustically-sensitive (surface acoustic wave) techniques, photo-sensitive (infra-red) techniques, and so forth. The effect of such overlays allows a display to be used as an input device, to remove or enhance the keyboard and/or the mouse as the primary input device for interacting with content provided on display 104. The embodiments are not limited in this context.

In one embodiment, communications system 100 may include a wireless device 120. Wireless device 120 may comprise, for example, a mobile or fixed wireless device. In one embodiment, for example, wireless device 120 may comprise a fixed wireless device operating as an access point for a network or communications system, such as a cellular radiotelephone communications system, a wireless local area network (WLAN), a wireless metropolitan area network (WMAN), a wireless wide area network (WWAN), and so forth. Examples for wireless device 120 may include a wireless access point, base station or device B, base station radio/transceiver, router, switch, hub, gateway, and so forth. In one embodiment, for example, wireless device 120 may comprise a base station for a cellular radiotelephone communications system. Although some embodiments may be described with wireless device 120 implemented as a base station by way of example, it may be appreciated that other embodiments may be implemented using other wireless devices as well. The embodiments are not limited in this context.

In one embodiment, mobile computing device 110 and wireless device 120 may comprise part of a cellular radiotelephone system. Examples of cellular radiotelephone systems may include Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, Narrowband Advanced Mobile Phone Service (NAMPS) cellular radiotelephone systems, third generation (3G) systems such as Wide-band CDMA (WCDMA), CDMA-2000, Universal Mobile Telephone System (UMTS) cellular radiotelephone systems compliant with the Third-Generation Partnership Project (3GPP), and so forth. The embodiments are not limited in this context.

In addition to voice communication services, mobile computing device 110 and wireless device 120 may be arranged to perform data communications using any number of different wireless protocols over wireless shared media 122-1. In one embodiment, for example, mobile computing device 110 and wireless device 120 may be arranged to perform data communications using any number of different WWAN data communication services. Examples of cellular data communication systems offering WWAN data communication services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, and so forth. In one embodiment, for example, mobile computing device 110 and wireless device 120 may also be arranged to communicate using a number of different WLAN data communication services. Examples of suitable WLAN data communication services may include the Institute of Electrical and Electronics Engineers (IEEE) 802.xx series of protocols, such as IEEE 802.11a/b/g/n, IEEE 802.16, IEEE 802.20, and so forth. In one embodiment, for example, mobile computing device 110 and wireless device 120 may be further arranged to communicate using a number of shorter range wireless protocols, such as a wireless personal area network (PAN) protocols, an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may include near-field communication techniques and protocols, such as electro-magnetic induction (EMI) techniques. An example of EMI techniques may include passive or active radio-frequency identification (RFID) protocols and devices. The embodiments are not limited in this respect.

In one embodiment, communications system 100 may include network 130 connected to wireless device 120 by wired communications medium 122-2. Network 130 may comprise additional devices and connections to other networks, including a voice/data network such as the Public Switched Telephone Network (PSTN), a packet network such as the Internet, a local area network (LAN), a metropolitan area network (MAN), a wide area network (WAN), an enterprise network, a private network, and so forth. In one embodiment, for example, network 130 may be arranged to communicate information in accordance with one or more Internet protocols as defined by the Internet Engineering Task Force (IETF), such as the Transmission Control Protocol/Internet Protocol (TCP/IP), for example. Network 130 may also include other cellular radio telephone system infrastructure and equipment, such as base stations, mobile subscriber centers, central offices, and so forth. The embodiments are not limited in this context.

In general operation, mobile computing device 110 may be capable of storing and executing a number of application programs. One example of an application program may include a memo application. A memo application may manage various types of memos or notes for a user. A memo may be created using different types of information, such as voice information, video information, audio information, text information, numerical information, symbols, alphanumeric symbols, graphics, images, computer generated images, pictures, icons, and so forth.

Improvements in memo applications may allow a user to generate a memo in a relatively short period of time under various conditions. For example, a user may use one hand to operate mobile computing device 110 in order to generate a quick voice memo while driving or during a business meeting. The increase in convenience, however, may also increase the overall number of memos to be managed by the memo application and a user. In some cases, a user may even forget that they created a memo, particularly if the memo is created quickly while performing other tasks.

In order to solve these and other problems, mobile computing device 110 may use various techniques to manage a memo application and/or memos in order to potentially enhance productivity, accessibility, and value to a user. In one embodiment, for example, mobile computing device 110 may include a memo application module (MAM). The MAM may be arranged to manage one or more memo applications and/or memos for mobile computing device 110. For example, mobile computing device 110 may include a memo database and a memo application. The memo application may be arranged to set a memo reminder value for a memo, store the memo with the memo reminder value in the memo database, and provide a memo reminder for the memo with the memo reminder value. In some embodiments, this may be accomplished using various software components implemented by a given operating system (OS) used with mobile computing device 110. In this manner, a user may be automatically reminded that a memo has been stored and not reviewed within a predefined amount of time, thereby allowing a user an opportunity to review and act upon the memo before it becomes outdated. Mobile computing device 110 in general, and the MAM in particular, may be described in more detail with reference to FIGS. 2-6.

Figure 2:
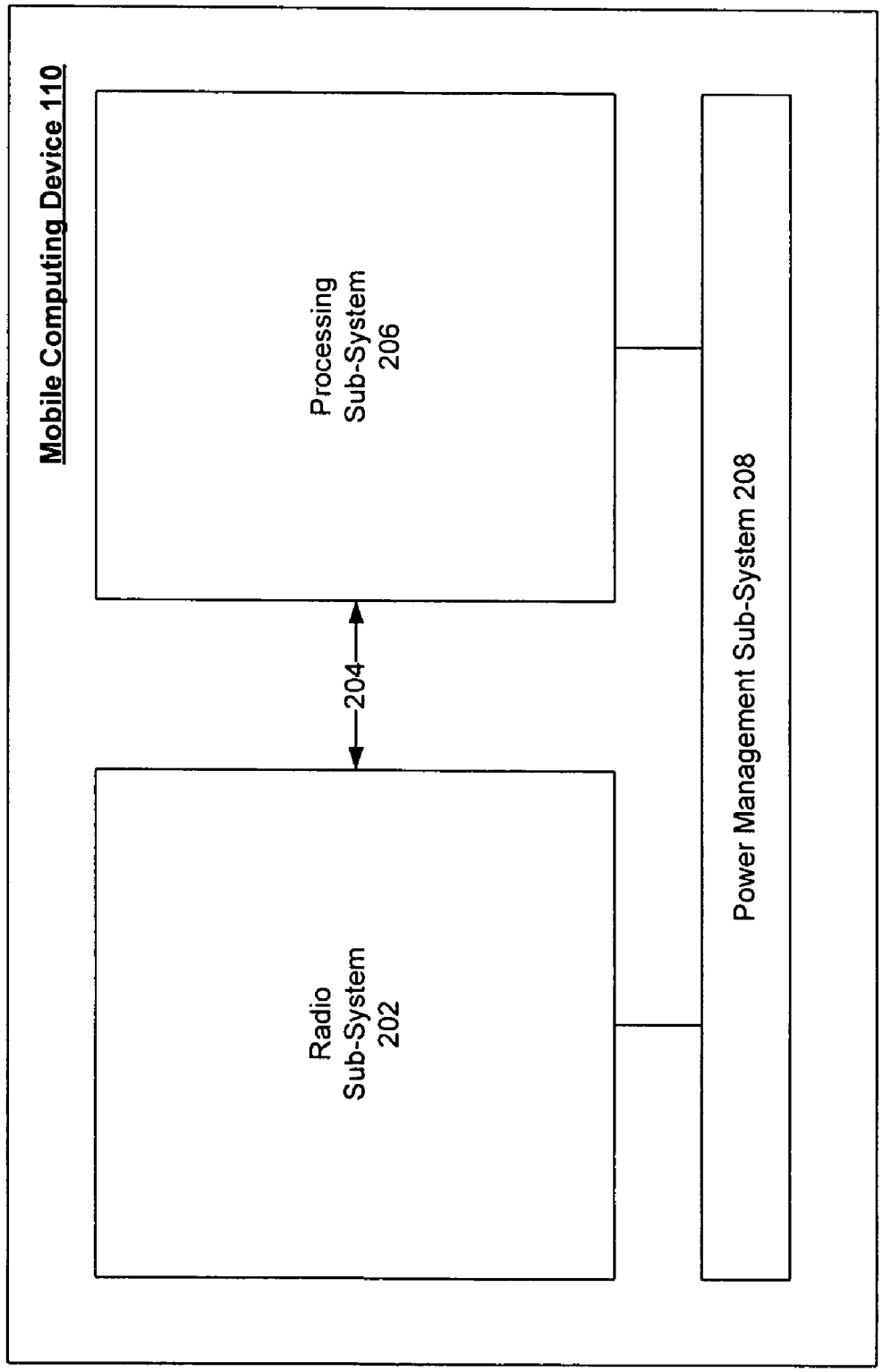
FIG. 2 illustrates one embodiment of a mobile computing device.

FIG. 2 illustrates one embodiment of a mobile computing device. FIG. 2 illustrates a more detailed block diagram of mobile computing device 110 as described with reference to FIG. 1. As shown in FIG. 2, mobile computing device 110 may comprise multiple elements. Although FIG. 2 shows a limited number of elements in a certain topology by way of example, it can be appreciated that more or less elements in any suitable topology may be used in mobile computing device 110 as desired for a given implementation. Furthermore, any element as described herein may be implemented using hardware, software, or a combination of both, as previously described with reference to device implementations. The embodiments are not limited in this context.

In various embodiments, mobile computing device 110 may include a radio sub-system 202 connected via bus 204 to a processing sub-system 206. Radio sub-system 202 may perform voice and data communications operations using wireless shared media 122-1 for mobile computing device 110. Processing sub-system 206 may execute software for mobile computing device 110. Bus 204 may comprise a USB or micro-USB bus and appropriate interfaces, as well as others.

In various embodiments, mobile computing device 110 may also include a power management sub-system 208. Power management sub-system 208 may manage power for mobile computing device 110, including radio sub-system 202, processing sub-system 206, and other elements of mobile computing device 110. For example, power management sub-system 208 may include one or more batteries to provide direct current (DC) power, and one or more alternating current (AC) interfaces to draw power from a standard AC main power supply. The embodiments are not limited in this context.

Figure 3:
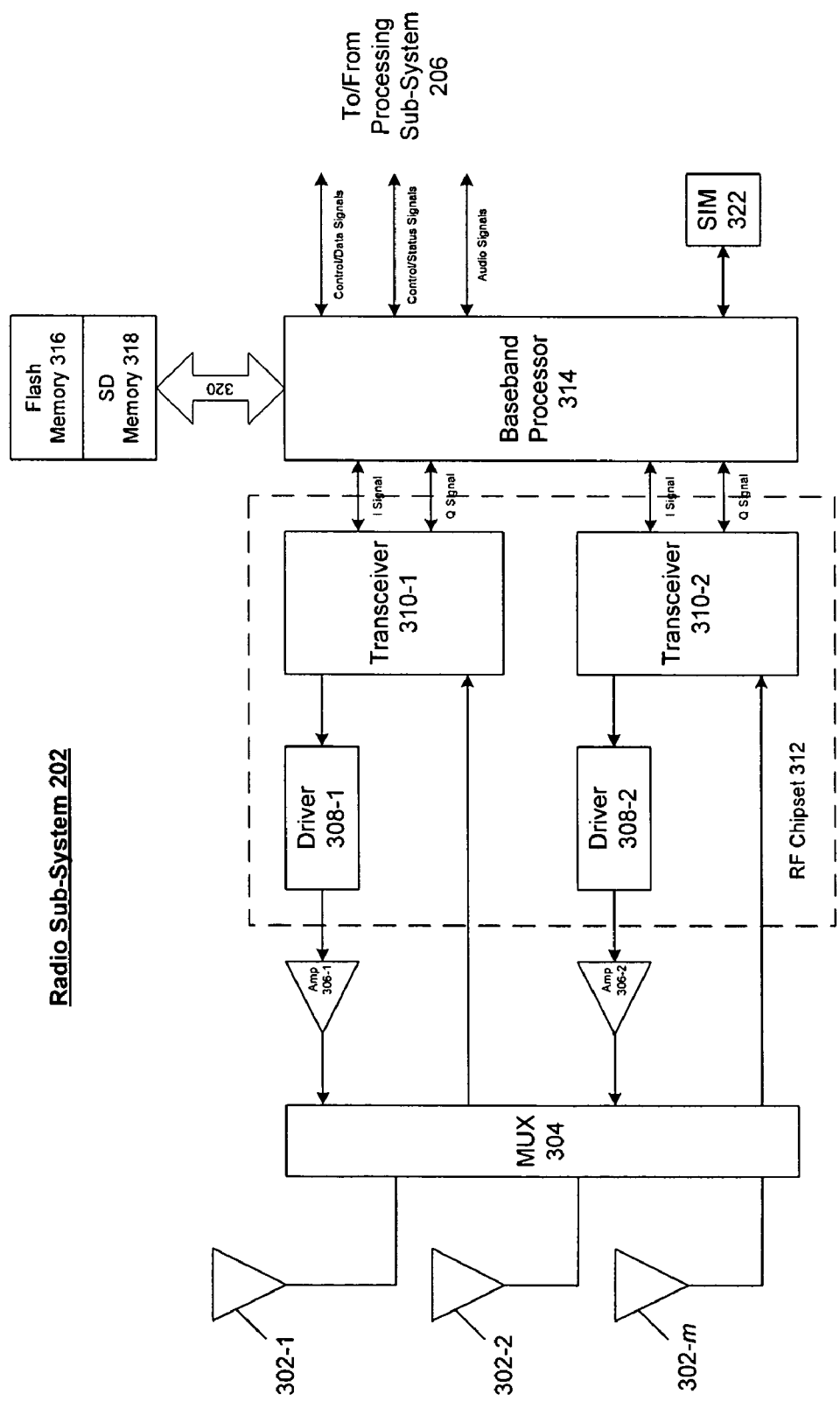
FIG. 3 illustrates one embodiment of a radio sub-system.

FIG. 3 illustrates one embodiment a radio sub-system. FIG. 3 illustrates a more detailed block diagram of radio sub-system 202 as described with reference to FIG. 2. Radio sub-system 202 may perform voice and data communication operations for mobile computing device 110. For example, radio sub-system 202 may be arranged to communicate voice information and control information over one or more assigned frequency bands of wireless shared media 122-1. The embodiments are not meant to be limited, however, to the example given in FIG. 3.

In various embodiments, radio sub-system 202 may include one or more antennas 302-1-$m$. Antennas 302-1-$m$ may be used for transmitting and/or receiving electrical signals. Examples for antennas 302-1-$m$ may include an internal antenna, an omni-directional antenna, a monopole antenna, a dipole antenna, an end fed antenna, a circularly polarized antenna, a micro-strip antenna, a diversity antenna, a dual antenna, an antenna array, a helical antenna, and so forth.

During transmission, antennas 302-1-$m$ may accept energy from a transmission line and radiate this energy into space via wireless shared media 122-1. During reception, antennas 302-1-$m$ may gather energy from an incident wave received over wireless shared media 122-1, and provide this energy to a corresponding transmission line. The amount of power radiated from or received by antennas 302-1-$m$ is typically described in terms of gain. Radio sub-system 202 may be implemented using a single antenna 302-1, or using an array of antennas 302-1-$m$ array, such as a quad band antenna array, for example. Multiple antennas may be desirable when implementing spatial diversity and/or Multiple-Input-Multiple-Output (MIMO) systems. The embodiments are not limited in this context.

In various embodiments, antennas 302-1-$m$ may be connected to a multiplexer 304. Multiplexer 304 multiplexes signals from power amplifiers 306-1, 306-2 for delivery to antennas 302-1-$m$. Multiplexer 304 demultiplexes signals received from antennas 302-1-$m$ for delivery to RF chipset 312. The embodiments are not limited in this context.

In various embodiments, multiplexer 304 may be connected to power amplifiers 306-1, 306-2. Power amplifiers 306-1, 306-2 may be used to amplify any signals to be transmitted over wireless shared media 122-1. Power amplifiers 306-1, 306-2 may work in all assigned frequency bands, such as 4 frequency bands in a quad-band system. Power amplifiers 306-1, 306-2 may also operate in various modulation modes, such as Gaussian Minimum Shift Keying (GSMK) modulation suitable for GSM systems and 8-ary Phase Shift Keying (8-PSK) modulation suitable for EDGE systems. The embodiments are not limited in this context.

In various embodiments, power amplifiers 306-1, 306-2 may be connected to an RF chipset 312. RF chipset 312 may also be connected to multiplexer 304. In one embodiment, for example, RF chipset 312 may comprise one or more transceivers in a transceiver array. For example, RF chipset 312 may include RF drivers 308-1, 308-2 each coupled to RF transceivers 310-1, 310-2, respectively. RF chipset 312 may perform modulation and direct conversion operations required for GMSK and 8-PSK signal types for quad-band E-GPRS radio, for example. RF chipset 312 receives analog I & Q signals from a baseband processor 314, and converts them to an RF signal suitable for amplification by power amplifiers 306-1, 306-2. Similarly, RF chipset 312 converts the signals received from wireless shared media 122-1 via antennas 302-1-$m$ and multiplexer 304 to analog I & Q signals to be sent to baseband processor 314. RF chipset 312 may be implemented using one or more chips as desired for a given implementation. The embodiments are not limited in this context.

In some embodiments, each transceiver 310-1, 310-2 may be arranged to perform data communications in accordance with a different set of wireless communications protocols and techniques. In one embodiment, for example, transceiver 310-1 may be arranged to communicate information in accordance with a first class of wireless communications protocols and techniques that are generally associated with cellular radiotelephone communication systems. Examples of the first class of protocols may include WWAN protocols, such as GSM/GPRS protocols, CDMA/1xRTT protocols, EDGE protocols, EV-DO protocols, EV-DV protocols, HSDPA protocols, and so forth. In one embodiment, for example, transceiver 310-2 may be arranged to communicate information in accordance with a second class of wireless communications protocols and techniques that are generally associated with a computer network. Examples of the second class of protocols may include WLAN protocols, such as one or more of the IEEE 802.xx series of protocols, such as IEEE 802.11a/b/g/n, IEEE 802.16, IEEE 802.20, and so forth. Other examples of the second class of protocols may include PAN protocols, Infrared protocols, Bluetooth protocols, EMI protocols including passive or active RFID protocols, and so forth. It may be appreciated that although the various protocols have been generally separated into a first class and a second class, it may be appreciated that transceivers 310-1, 310-2 may be arranged to use any type of protocol from either class as desired for a given implementation. It may also be appreciated that although RF chipset 312 is shown with two transceivers 310-1, 310-2 by way of example, RF chipset 312 may be implemented using more or less transceivers as desired for a given implementation. The embodiments are not limited in this respect.

In various embodiments, RF chipset 312 may be connected to baseband processor 314. Baseband processor 314 may perform baseband operations for radio sub-system 202. Baseband processor 314 may comprise both analog and digital baseband sections. The analog baseband section includes I & Q filters, analog-to-digital converters, digital-to-analog converters, audio circuits, and other circuits. The digital baseband section may include one or more encoders, decoders, equalizers/demodulators, GMSK modulators, GPRS ciphers, transceiver controls, automatic frequency control (AFC), automatic gain control (AGC), power amplifier (PA) ramp control, and other circuits. The embodiments are not limited in this context.

In various embodiments, baseband processor 314 may also be connected to one or more memory units via a memory bus 320. In one embodiment, for example, baseband processor 314 may be connected to a flash memory unit 316 and a secure digital (SD) memory unit 318. Memory units 316, 318 may be removable or non-removable memory. In one embodiment, for example, baseband processor 314 may use approximately 1.6 megabytes of static read-only memory (SRAM) for E-GPRS and other protocol stack needs.

In various embodiments, baseband processor 314 may also be connected to a subscriber identity module (SIM) 322. Baseband processor 314 may have a SIM interface for SIM 322. SIM 322 may comprise a smart card that encrypts voice and data transmissions and stores data about the specific user so that the user can be identified and authenticated to the network supplying voice or data communications. SIM 322 may also store data such as personal phone settings specific to the user and phone numbers. SIM 322 can be removable or non-removable. The embodiments are not limited in this context.

In various embodiments, baseband processor 314 may further include various interfaces for communicating with a host processor of processing sub-system 206. For example, baseband processor 314 may have one or more universal asynchronous receiver-transmitter (UART) interfaces, one or more control/status lines to the host processor, one or more control/data lines to the host processor, and one or more audio lines to communicate audio signals to an audio sub-system of processing sub-system 206. The embodiments are not limited in this context.

Figure 4:
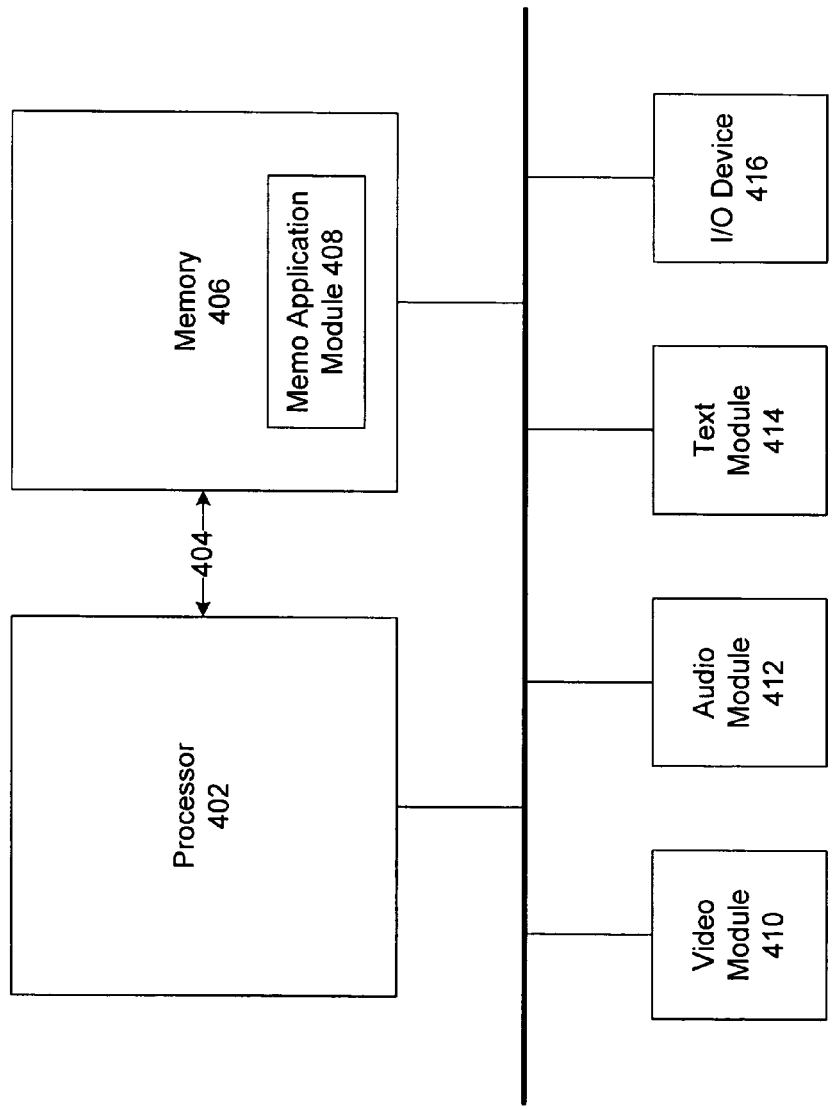
FIG. 4 illustrates one embodiment of a processing sub-system.

FIG. 4 illustrates one embodiment a processing sub-system. FIG. 4 illustrates a more detailed block diagram of processing sub-system 206 as described with reference to FIG. 2. Processing sub-system 206 may provide computing or processing operations for mobile computing device 110. For example, processing sub-system 206 may be arranged to execute various software programs for mobile computing device 110. Although processing sub-system 206 may be used to implement certain operations for various embodiments as software executed by a processor, it may be appreciated that the operations performed by processing sub-system 206 may also be implemented using hardware circuits or structures, or a combination of hardware and software, as desired for a particular implementation. The embodiments are not limited in this context.

In various embodiments, mobile computing device 110 may be capable of executing various types of software programs using processing sub-system 206. Software programs may be generally grouped into application programs and system programs. Application programs allow a user to accomplish one or more specific tasks. Typical applications include office suites, business software, educational software, databases, communications software, computer games, and so forth. Examples of application programs may include mail programs, web browsers, personal information manager applications, calendar programs, scheduling programs, contact management programs, gaming programs, word processing programs, spreadsheet programs, picture management programs, video reproduction programs, audio reproduction programs, groupware programs, and so forth. Most application software has a graphical user interface (GUI) to communicate information between a device and a user. System programs assists in the running of a computer system. System programs may be directly responsible for controlling, integrating, and managing the individual hardware components of the computer system. Examples of system programs may include operating systems (OS), device drivers, programming tools, utility programs, software libraries, interfaces, program interfaces, API, and so forth.

In various embodiments, processing sub-system 206 of mobile computing device 110 may be capable of executing various types of system programs, such as different OS. In computing, an OS is the system software responsible for the direct control and management of hardware and basic system operations. Additionally, it provides a foundation upon which to run application software such as word processing programs and web browsers. Mobile computing device 110 may utilize any OS suitable for smaller form factor devices, such as a Palm OS®, Palm OS® Cobalt, Microsoft Windows® CE, Microsoft Pocket PC, Symbian OS™, Embedix OS, and others. The embodiments are not limited in this context.

In various embodiments, processing sub-system 206 may include various elements potentially useful in creating a memo. As shown in FIG. 4, processing sub-system 206 may include a video module 410, an audio module 412, a text module 414, and an I/O module 416. Elements 410, 412, 414 and 416 may have various sub-elements needed to create a memo for a particular modality or input. For example, video module 410 may be used to form a video memo, and may include a camera, a microphone, a speaker, a video coder/decoder (codec), a video player, and so forth. Audio module 412 may be used to form an audio memo, and may include a microphone, a speaker, an audio codec, an audio player, and so forth. Text module 414 may be used to form a text memo, and may include a text interface, such as a handwriting recognizer, a keyboard, an alphanumeric keypad such as used in cellular telephones, a touch screen, a mouse, a pointing device, cursor control, hard buttons, soft buttons, switches, and so forth. I/O module 416 may include any desired input and output elements that may be accessible or shared by elements of mobile computing device 110, such as video module 410, audio module 412, and/or text module 414. For example, I/O module 416 may include a thumb keyboard, a four-way navigation button, dedicated hardware buttons or switches, a camera, a microphone, a speaker, a display, a touch screen, and so forth.

In various embodiments, processing sub-system 206 may include processor 402. Processor 402 may be implemented using any processor or logic device, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, processor 402 may be implemented as a general purpose processor, such as a processor made by Intel® Corporation, Santa Clara, Calif. Processor 402 may also be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), and so forth. The embodiments, however, are not limited in this context.

In one embodiment, processing sub-system 206 may include memory 406 to connect to processor 402. Memory 406 may be implemented using any machine-readable or computer-readable media capable of storing data, including both volatile and non-volatile memory. For example, memory 406 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 406 may be included on the same integrated circuit as processor 402 thereby obviating the need for bus 404. Alternatively some portion or all of memory 406 may be disposed on an integrated circuit or other medium, for example a hard disk drive, that is external to the integrated circuit of processor 402, and processor 402 may access memory 406 via memory bus 404. The embodiments are not limited in this context.

In various embodiments, memory 406 may store one or more software components. A software component may refer to one or more programs, or a portion of a program, used to implement a discrete set of operations. In one embodiment, for example, memory 406 may include one or more software components, such as a MAM 408. MAM 408 may be responsible for certain memo management operations of mobile computing device 110. It is worthy to note that although some embodiments may describe these modules as software components executed by processing sub-system 206, it may be appreciated that some or all of the operations of the software components may be implemented using other processors accessible by mobile computing device 110, such as baseband processor 314, for example. Furthermore, these modules may also be implemented using dedicated hardware circuits or structures, or a combination of dedicated hardware and software, as desired for a given implementation. The embodiments are not limited in this context.

Figure 5:
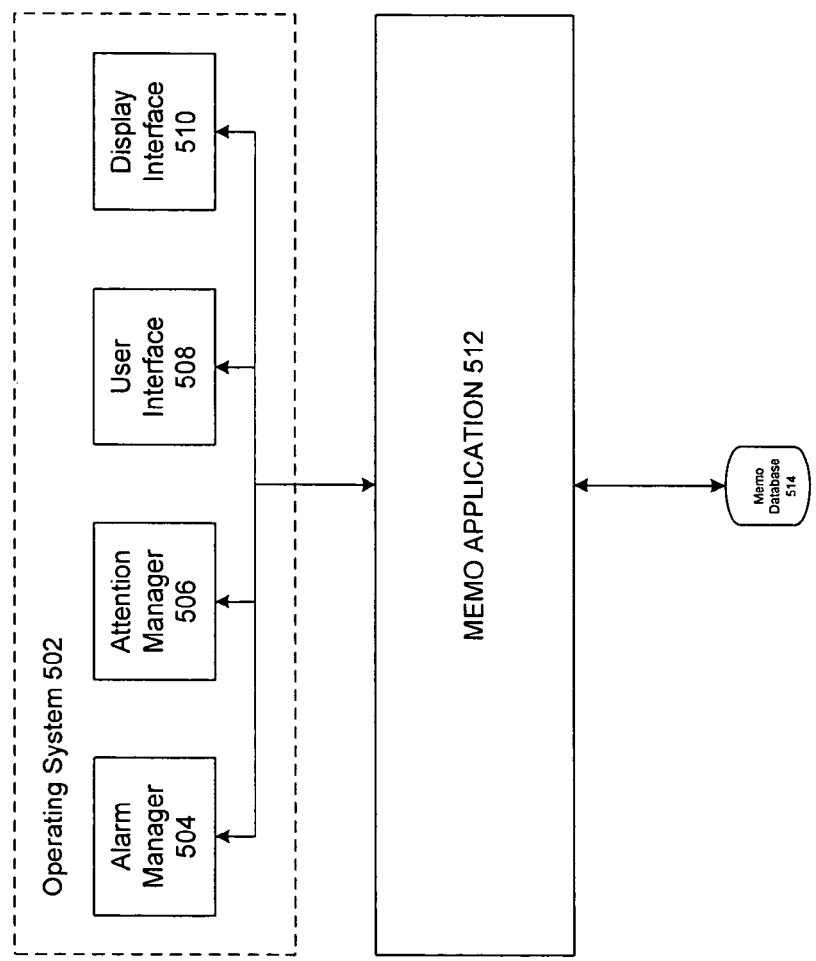
FIG. 5 illustrates one embodiment of a memo application module.

FIG. 5 illustrates one embodiment of a memo application module. FIG. 5 illustrates an example for MAM 408. As shown in FIG. 5, MAM 408 includes an OS 502, a memo application 512, and a memo database 514. OS 502 includes an alarm manager 504, an attention manager 506, a user interface 508, and a display interface 510. It may be appreciated that the elements of OS 502 may also be implemented as part of memo application 512, or memo application 512 as part of OS 502, or some combination thereof, and such combinations would still fall within the scope of the embodiments.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

In various embodiments, MAM 408 may include memo application 512 coupled to memo database 514. Memo application 512 may be arranged to create a memo using, for example, one or more of video module 410, audio module 412, and/or text module 414. Alternatively, memo application 512 may receive a memo from another application.

Once a memo has been created, memo application 512 may set a memo reminder value for the memo. The memo reminder value may be a status flag used to indicate whether a memo has been reproduced or reviewed by a user. For example, the memo reminder value may be set to a logical one (1) to indicate that the memo has not been reviewed, a logical zero (0) to indicate that the memo has been reviewed, or vice-versa. Memo application 512 may store the memo with the corresponding memo reminder value in memo database 514. Memo application 512 may use the memo reminder value to determine whether to provide a memo reminder for the memo depending upon the current value set for the memo reminder value (e.g., 1 or 0).

In various embodiments, OS 502 of MAM 408 may include alarm manager 504. Alarm manager 504 may be coupled to memo application 512. Alarm manager 504 may manage alarm operations for OS 502 of mobile computing device 110. An application or user may use alarm manager 504 to set various reminders or alarms. Alarm manager 504 may include, for example, a timer and a message interface. Alarm manager 504 may use the timer and message interface to send an alarm message at a certain date and/or time. Memo application 512 may schedule an alarm for a predefined time for a given memo with alarm manager 504. For example, a user may use memo application 512 and/or alarm manager 504 to set a memo reminder for any memos not reviewed within a predefined time period of two days. Alarm manager 504 may record a date and/or time when the memo reminder was set, and use the timer to determine when two days have elapsed or expired, and send an alarm message to memo application 512 to indicate that a memo reminder is needed. In some cases, alarm manager 504 may also send an alarm message to attention manager 506 or display interface 510 directly thereby bypassing memo application 512.

If a memo has been reviewed within the predefined time period, memo application 512 may cancel the alarm set with alarm manager 504. Memo application 512 may determine whether a memo has been reproduced, played, or otherwise reviewed by a user in a number of different ways. For example, a user may use memo application 512 to reproduce a memo. In this case, memo application 512 may determine that a memo has been reviewed since it was the element actually used to reproduce the memo. In another example, a user may use video module 410, audio module 412, and/or text module 414 to reproduce the memo. In this case, video module 410, audio module 412, and/or text module 414, may send a memo review message to memo application 512 indicating that a memo has been reviewed. The memo review message may include any information needed to uniquely identify a given memo, such as a memo identifier, creation date and/or time for the memo, memo reminder date and/or time for the memo, and so forth. Once memo application 512 determines that a memo has been reviewed by a user, memo application 512 may clear the memo reminder value for the memo as stored in memo database 514. This may be accomplished by changing the memo reminder value to an appropriate value indicating that the memo has been reviewed (e.g., from 1 to 0). Memo application 512 may send a cancel message to alarm manager 504 in order to cancel the alarm for the relevant memo.

In various embodiments, OS 502 of MAM 408 may include attention manager 506. Attention manager 506 may be coupled to memo application 512. Attention manager 506 may provide an attention indicator to attract the attention of a user. The attention indicator may comprise a visual, audible and/or tactile indicator. A visual indicator may include providing visual information on display 104. For example, attention manager 506 may cause a visual indicator such as a blinking symbol or icon to occur somewhere on display 104, such as a highlighted asterisk symbol blinking in the top left hand corner of display 104. Attention manager 506 may be used to indicate that there are messages waiting for review by a user, such as email messages, voicemail messages, text messages, instant messages, and so forth. An audible indicator may include a voice message, tone, ring tone, beep, or some other audible information capable of being reproduced by audio module 412. A tactile indicator may include causing housing 102 to vibrate or pulse.

Attention manager 506 may also be used to provide visual, audible and/or tactile attention indicators to attract the attention of a user and indicate that there are memos to be reviewed by the user. Assume that alarm manager 506 sends an alarm message to memo application 512 indicating that the predefined time period associated with one or more memos has expired. Memo application 512 may send an attention request message to attention manager 506. Attention manager 506 may receive the attention request message, and provide an attention indicator to display interface 510 and/or display 104 in an attempt to attract the attention of a user.

In various embodiments, OS 502 of MAM 408 may include user interface 508. User interface 508 may be coupled to memo application 512 and/or attention manager 506. User interface 508 may be a graphic user interface (GUI) or some other user interface that is capable of conveying information to a user and receiving user commands from a user (e.g., via I/O 416). In response to an attention indicator provided by attention manager 506, a user may use user interface 508 to provide a user command in response to the indicator. For example, if the indicator is a blinking symbol or icon provided in a top left hand corner of display 104, and display 104 is a touch screen display, a user may tap the blinking symbol or icon in order to acknowledge the indicator from attention manager 506. User interface 508 may receive the user command, and send the user command to attention manager 506. Attention manager 506 may generate and send an attention response message to the attention request message provided by memo application 512, with the attention response message conveying or indicating that a user command has been received.

Memo application 512 may receive the attention response message from attention manager 506, and initiate operations to search memo database 514 for any unplayed or unreviewed memos. Memo application 512 may search memo database 514 for any memos with set memo reminder values. Memo application 512 may provide a memo reminder for the located memos. The memo reminder may comprise a visual memo reminder, an audible memo reminder, or a tactile memo reminder. In one embodiment, for example, memo application 512 may provide a memo reminder via display interface 510 and/or display 104. The memo reminder may comprise any desired format and accompanying information. For example, the memo reminder might be "There are 4 unplayed voice memos" with an accompanying list of the unplayed voice memos.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
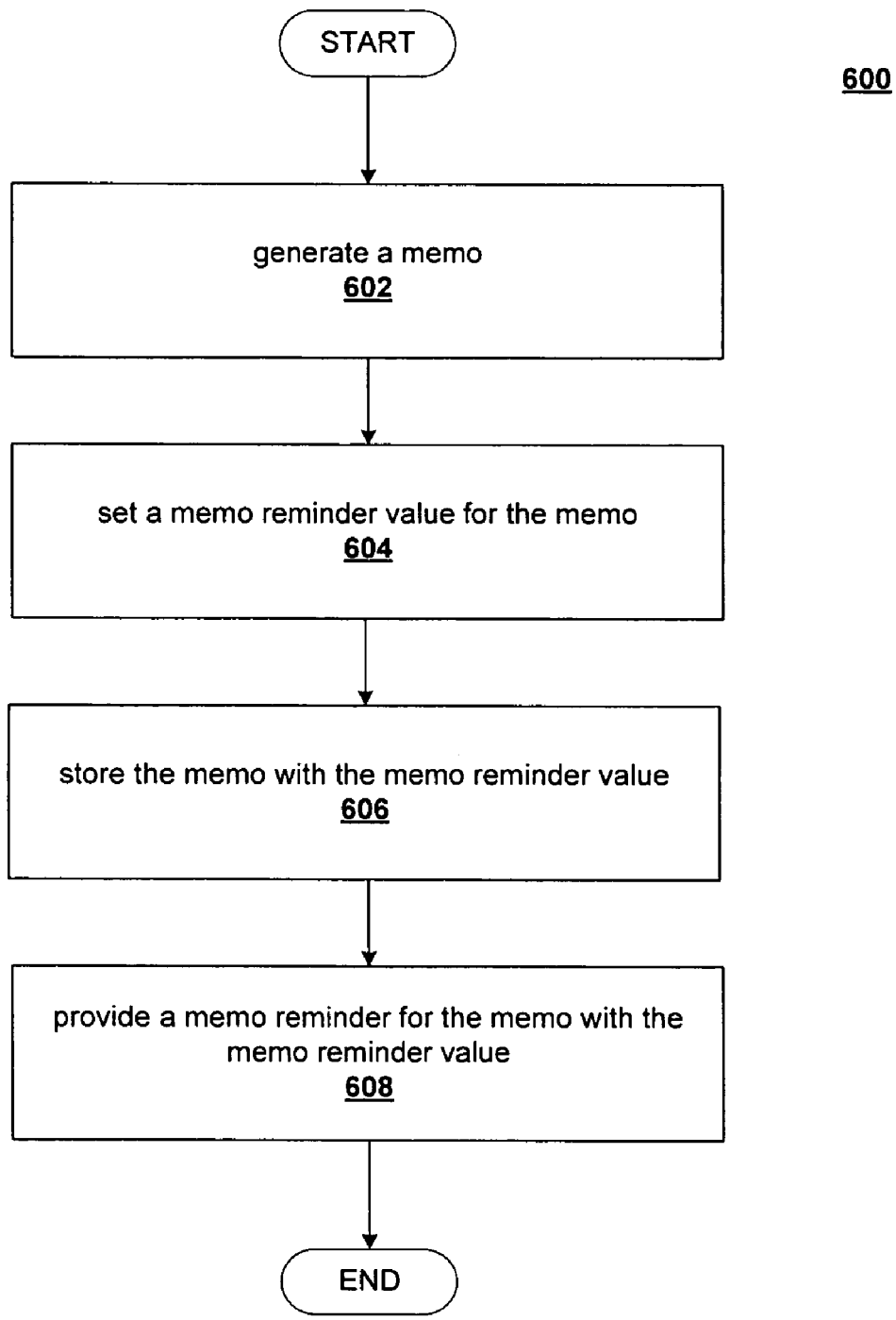
FIG. 6 illustrates one embodiment of a logic diagram.

FIG. 6 illustrates one embodiment of a logic flow. FIG. 6 illustrates a logic flow 600. Logic flow 600 may be representative of the operations executed by one or more embodiments described herein, such as mobile computing device 110. As shown in logic flow 600, a memo may be generated at block 602. A memo reminder value may be set for the memo 604. The memo may be stored with the memo reminder value at block 606. A memo reminder for the memo with the memo reminder value may be provided at block 608. The embodiments are not limited in this context.

In one embodiment, an alarm may be scheduled for a predefined time for the memo. The embodiments are not limited in this context.

In one embodiment, a determination may be made as to whether the memo has been reviewed. The memo reminder value for the memo may be cleared. The alarm for the memo may be cancelled. The embodiments are not limited in this context.

In one embodiment, an alarm message indicating the predefined time has expired may be received. An attention request message may be sent. An attention response message may be received. The memo database may be searched for memos with set memo reminder values. A memo reminder for the memos with set memo reminder values may be provided. In one embodiment, for example, a list of memos having set memo reminder values may be displayed. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. A mobile computing device, comprising:
a memo database;
a memo application coupled with said memo database, said memo application to set a memo reminder value for a memo indicating whether said memo has been reviewed, store said memo with said memo reminder value in said memo database, and provide a memo reminder for said memo;
an alarm manager coupled with said memo application, said memo application to schedule an alarm for said memo with said alarm manager: wherein said alarm is scheduled a predetermined time period from a creation time of said memo, said alarm is canceled by the memo application when a memo reminder value indicates that said memo has been reviewed prior to said scheduled alarm; and
an attention manager coupled with said memo application, said memo application to receive an alarm message indicating said predetermined time has expired from said alarm manager and send an attention request message to said attention manager, said attention manager to provide an attention indicator;
said memo reminder comprising information to remind a user that the associated memo has been stored and not reviewed, said memo including content different from a content of said memo reminder.

2. The mobile computing device of claim 1, comprising a user interface coupled with an attention manager, said user interface to receive a user command in response to an attention indicator and provide said user command to said attention manager, said attention manager to send an attention response message to said memo application.

3. The mobile computing device of claim 1, said memo application to receive an attention response message, search said memo database for memos with set memo reminder values, and provide a memo reminder for said memos with set memo reminder values.

4. The mobile computing device of claim 1, said memo reminder comprising a visual memo reminder, an audible memo reminder, or a tactile memo reminder.

5. A mobile computing device, comprising:
an antenna;
a radio sub-system; and
a processing sub-system coupled with said radio sub-system, said processing sub-system comprising a processor and memory,
said memory to store:
a memo database,
a memo application,
an alarm manager,
an attention manager, and
a user interface,
said processor to:
execute said memo application to set a memo reminder value for a memo indicating whether said memo has been reviewed,
store said memo with said memo reminder value in said memo database,
provide a memo reminder for said memo,
provide an alarm to said memo application, wherein said alarm is scheduled a predetermined time period from a creation time of said memo, said alarm is canceled by the memo application when a memo reminder value indicates that said memo has been reviewed prior to said scheduled alarm, provide an attention indicator in response to an attention request message from said memo application, send a user command in response to said attention indicator to said attention manager, said attention manager to send an attention response message to said memo application, said memo reminder comprising information to remind a user that the associated memo has been stored and not reviewed, said memo including content different from a content of said memo reminder.

6. The mobile computing device of claim 5, comprising a touch screen display coupled to said processing sub-system, said touch screen display to display said attention indicator, receive a user command in response to said attention indicator, and display a list of memos with set memo reminder values received from said memo application.

7. A computer-implemented method, comprising:

generating a memo;

setting a memo reminder value for said memo by a processor;

storing, in a non-transitory computer-readable storage medium, said memo with said memo reminder value indicating whether said memo has been reviewed;

providing a memo reminder for said memo;

scheduling an alarm for said memo a predetermined time period from a creation time of said memo, said alarm is canceled by the memo application when a memo reminder value indicates that said memo has been reviewed prior to said scheduled alarm;

receiving an alarm message indicating said predetermined time has expired;

sending an attention request message;

receiving an attention response message;

searching said memo database for memos with set memo reminder values; and providing a memo reminder for said memos with set memo reminder values, said memo reminder comprising information to remind a user that the associated memo has been stored and not reviewed, said memo including content different from a content of said memo reminder.

8. The method of claim 7, comprising displaying a list of memos having set memo reminder values.

9. An article comprising a non-transitory computer-readable storage medium containing instructions that when executed enable a system to:

generate a memo, set a memo reminder value for said memo, store said memo with said memo reminder value, schedule an alarm for said memo a predetermined time period from a creation time of said memo, said alarm is canceled by the memo application when a memo reminder value indicates that said memo has been reviewed prior to said scheduled alarm, provide a memo reminder for said memo; said memo reminder comprising information to remind a user that the associated memo has been stored and not reviewed, said memo including content different from a content of said memo reminder, receive an alarm message indicating said predetermined time has expired, send an attention request message, receive an attention response message, search said memo database for memos with set memo reminder values, and provide a memo reminder for said memos with set memo reminder values.

10. The article of claim 9, further comprising instructions that if executed enable the system to display a list of memos having set memo reminder values.

* * * * *